(12) United States Patent
Drake et al.

(10) Patent No.: US 7,989,374 B2
(45) Date of Patent: Aug. 2, 2011

(54) NON-CONTAMINATING, ELECTRO-CHEMICALLY STABLE GLASS FRIT SEALING MATERIALS AND SEALS AND DEVICES USING SUCH SEALING MATERIALS

(75) Inventors: Melinda Ann Drake, Corning, NY (US); Lisa Ann Lamberson, Painted Post, NY (US); Robert Michael Morena, Lindley, NY (US)

(73) Assignee: Corning Incorporated, Corning, NY (US)

( * ) Notice: Subject to any disclaimer, the term of this patent is extended or adjusted under 35 U.S.C. 154(b) by 371 days.

(21) Appl. No.: 12/152,540

(22) Filed: May 15, 2008

(65) Prior Publication Data

US 2009/0286664 A1 Nov. 19, 2009

(51) Int. Cl.
*C03C 8/02* (2006.01)
*C03C 8/00* (2006.01)
*C03C 8/24* (2006.01)
*C03C 8/14* (2006.01)
*C03C 8/20* (2006.01)
*C03C 8/04* (2006.01)

(52) U.S. Cl. ........... 501/21; 501/14; 501/15; 501/17; 501/18; 501/26

(58) Field of Classification Search ............. 501/14, 501/15, 17, 18, 21, 26; 427/115; 429/12
See application file for complete search history.

(56) References Cited

U.S. PATENT DOCUMENTS

| | | | |
|---|---|---|---|
| 4,624,934 A | 11/1986 | Kokubu et al. | 501/17 |
| 4,839,313 A * | 6/1989 | Kondo et al. | 501/14 |
| 7,214,441 B2 | 5/2007 | Cortright et al. | 429/35 |
| 2005/0277541 A1* | 12/2005 | Yoshii et al. | 501/26 |
| 2006/0063659 A1 | 3/2006 | Xue et al. | 501/15 |
| 2006/0160690 A1 | 7/2006 | Cortright et al. | 501/15 |
| 2006/0172875 A1* | 8/2006 | Cortright et al. | 501/15 |
| 2007/0238599 A1* | 10/2007 | Pinckney et al. | 501/5 |
| 2007/0238601 A1 | 10/2007 | Pinckney et al. | 501/68 |
| 2008/0090715 A1* | 4/2008 | Badding et al. | 501/5 |

FOREIGN PATENT DOCUMENTS

EP 0900768 3/1999

* cited by examiner

*Primary Examiner* — Jerry Lorengo
*Assistant Examiner* — Noah S Wiese
(74) *Attorney, Agent, or Firm* — Svetlana Z. Short

(57) ABSTRACT

A solid oxide fuel cell device includes layers of solid electrolyte, cathode plates, anode plates, a frame and a non-contaminating, electrochemically stable sealing material. The sealing material may have a CTE of about $95 \times 10^{-7}/°C$ to about $115 \times 10^{-7}/°C$. The sealing material may include from about 65 wt % to about 100 wt % of glass frit and from about 0 wt % to about 35 wt % of a filler material. The glass frit may include from about 0 mol % to about 43 mol % of a metal oxide expressed as RO wherein R comprises magnesium, calcium, strontium, barium, zinc and/or combinations thereof. The glass frit may also include from about 0 mol % to about 5 mol % $Al_2O_3$; from about 0 mol % to about 7 mol % $TiO_2$; and from about 41 mol % to about 60 mol % $SiO_2$.

7 Claims, 2 Drawing Sheets

NON-CONTAMINATING, ELECTRO-CHEMICALLY STABLE GLASS FRIT SEALING MATERIALS AND SEALS AND DEVICES USING SUCH SEALING MATERIALS

FIELD OF THE INVENTION

The present invention generally relates to glass frit sealing materials such as alkali- and boron-free silicate glass frit sealing materials and, more specifically, glass frit sealing materials suitable for use as seals for solid oxide fuel cells (SOFC).

BACKGROUND OF THE INVENTION

The sealing materials in a fuel cell assembly, such as a solid oxide fuel cell (SOFC) device, are intended to provide a robust, hermetic seal between the frame of the fuel cell and the electrolyte contained in the fuel cell. The sealing material must be able to survive extended service at elevated temperatures and repeated thermal cycles. For example, fuel cell devices undergo large thermal cycling and are subject to large thermal gradients which may induce thermal stresses in the fuel cell components. If the sealing material expands at a rate that is different than the thermal expansion rate of the frame or the electrolyte sheet, the sealing material may either crack or cause cracking of the electrolyte sheet. Accordingly, sealing materials used in fuel cell frit seals need to be able to withstand high temperature fluctuations and have coefficients of thermal expansion (CTE) compatible with the electrolyte sheets used in the fuel cell as well as the material comprising the frame of the fuel cell.

In addition to these physical requirements, the sealing materials must meet certain chemical requirements. For example, the sealing materials must not degrade the electrical operation of the device, either through contamination of the solid oxide fuel cell cathode or contamination of other components contained in the fuel cell. Further, the sealing materials must be electro-chemically stable and not exhibit ion mobility under an applied electric field as this may lead to failures through the generation of oxygen blisters. Also, the sealing materials should exhibit acceptable flow characteristics in the desired sealing temperature range. Frit seal materials used to form hard seals should exhibit crystallization in the desired sealing range in addition to acceptable flow characteristics and mechanical robustness.

Despite these requirements, many material compositions presently used for glass frit sealing materials contain $Li_2O$, $B_2O_3$ and/or other alkali oxides. Sealing materials containing these oxides may be contaminating, electro-chemically unstable, and/or lack robustness. More specifically, frit seal materials containing $Li_2O$ may lead to electrochemical decay while frit seal materials containing $B_2O_3$ may lead to cathode contamination. In either case, the performance of the fuel cell may be degraded based on the presence of such materials.

Accordingly, a need exists for improved glass frit-based sealing materials for solid oxide fuel cells.

SUMMARY OF THE INVENTION

In one embodiment, a solid oxide fuel cell (SOFC) device includes layers of solid electrolyte, cathode plates, anode plates, a frame and a non-contaminating, electrochemically stable sealing material. Each electrolyte sheet may, for example, support a plurality of interconnected cathodes and anodes forming a multicell SOFC device. The sealing material may have a CTE of about $95 \times 10^{-7}/°$ C. to about $115 \times 10^{-7}/°$ C. The sealing material may include from about 65 wt % to about 100 wt % of glass frit and from about 0 wt % to about 35 wt % of a filler material. The glass frit may include from about 0 mol % to about 43 mol % of a metal oxide expressed as RO wherein R comprises magnesium, calcium, strontium, barium, zinc and/or combinations thereof. The glass frit may also include from about 0 mol % to about 5 mol % $Al_2O_3$; from about 0 mol % to about 7 mol % $TiO_2$; and from about 40 mol % to about 60 mol % $SiO_2$. For example, the glass frit may include 0.1 to 5 mol % of $Al_2O_3$ and 0.1 to 7 mol % $TiO_2$.

In another embodiment, a sealing material for use in conjunction with a solid oxide fuel cell device includes from about 80 wt % to about 100 wt % of glass frit and from about 0 wt % to about 20 wt % of a filler material. The glass frit may include from about 0 mol % to about 10 mol % MgO; from about 5 mol % to about 15 mol % CaO; from about 5 mol % to about 15 mol % SrO; about 0.1 to 10 mol % BaO; from about 0 mol % to about 10 mol % ZnO; about 0 to 5 mol % $TiO_2$ (e.g., 0.1 mol % $TiO_2$, or 4 mol % $TiO_2$); and about 40 to 60 (e.g. 56 mol %) $SiO_2$. For example, the glass frit may include 0.1 to 10 mole % MgO, and 0.1 to 10 mol % ZnO. The sealing material may have a coefficient of thermal expansion of about $95 \times 10^{-7}/°$ C. to about $115 \times 10^{-7}/°$ C.

In another embodiment, a sealing material for use in conjunction with a solid oxide fuel cell device includes from about 80 wt % to about 100 wt % of glass frit and from about 0 wt % to about 20 wt % of a filler material. The glass frit may include from about 33 mol % to about 43 mol % CaO; from about 9 mol % to about 12 mol % SrO; from about 2 mol % to about 3 mol % ZnO; from about 2.5 mol % to about 5 mol % $Al_2O_3$; and from about 40 mol % to 48 mol % $SiO_2$. The sealing material may have a coefficient of thermal expansion of about $94 \times 10^{-7}/°$ C. to about $115 \times 10^{-7}/°$ C.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The embodiments set forth in the drawings are illustrative in nature and not intended to be limiting of the invention defined by the claims. Moreover, the following description of the specific illustrative embodiments of the present invention can be understood when read in conjunction with the following drawings where similar structure is indicated with like reference numerals and in which:

DETAILED DESCRIPTION OF THE ILLUSTRATIVE EMBODIMENTS

Figure 1:
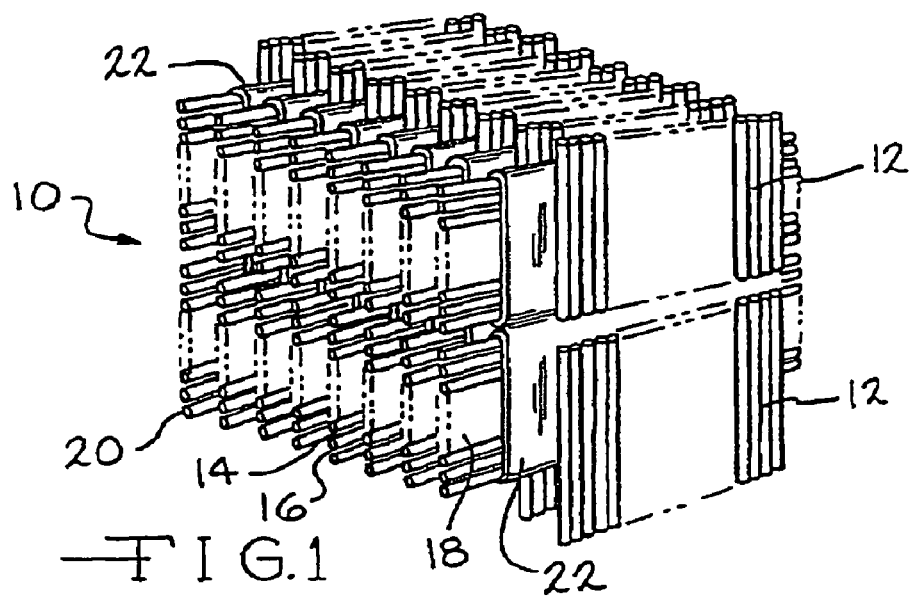
FIG. 1 is a schematic perspective view of an exemplary solid oxide fuel cell device assembly.

Table 1 lists a range of molar compositions for forming non-contaminating, electro-chemically stable glass frit-based sealing materials for use in conjunction with solid oxide fuel cell (SOFC) devices. Table 2 lists specific molar compositions for a number of exemplary glass frit compositions which may be used to form the sealing materials. In general, the sealing materials are $LiO_2$— and $B_2O_3$-free silicate glasses modified with various metal oxides, including ZnO, Al$_2$O$_3$, TiO$_2$ and others to obtain the desired chemical and thermal characteristics. Various compositions for forming glass-based frit sealing materials and methods of using the sealing materials in conjunction with SOFC devices will be described in more detail herein.

SOFC devices typically operate at elevated temperature ranges (typically in the range of about 700° C. to about 800° C.) in order to achieve optimum operation efficiency. Hermetic seals are typically required for the operation of the SOFC device to prevent the mixing of fuel and oxidant gasses outside of the fuel cell stack as well as to prevent leakage of fuel and oxidant within the fuel cell stack. The seals may also serve to electrically isolate components of the cell. In order to insure proper operation of the SOFC device, the seals must remain structurally and chemically stable for extended periods under operational temperatures and in the chemically corrosive environment of the SOFC device. The seal must also be chemically compatible with other fuel cell materials so as not to induce corrosion or material break-down. Further, the seal should not contribute significantly to thermal stresses induced in the fuel cell by thermal cycling. As such, the sealing material should have thermal expansion coefficients (CTEs) that are substantially the same as other components within the SOFC device, such as the electrolyte and/or the frame.

Further, the sealing material should seal at a temperature less than the lowest processing temperature of other components in the SOFC device to avoid damaging such components during sealing. The sealing material should readily flow at the sealing temperature (also referred to as the sintering temperature) and wet and bond to the components of the SOFC that are to be sealed and/or joined. Further, it is desired that the sealing materials have relatively low viscosities at the sealing temperature (typically from about 850° C. to about 900° C.) while having higher viscosities in the operating temperature range of the SOFC device (from about 700° C. to about 800° C.). These characteristics permit the sealing material to readily flow over the components to be sealed or joined at the sealing temperature while providing a seal that is not readily thinned or weakened as a result of temperatures encountered during normal operation of the SOFC device.

According to one embodiment, a sealing material for use in conjunction with a solid oxide fuel cell may have sufficient flow or viscosity at a sealing temperature range of about 850° C. to about 900° C. to wet and bond to high-Cr content frame materials, such as 446 stainless steel or a similar material, and the zirconia electrolyte of the fuel cell.

The sealing material may also have a coefficient of thermal expansion (CTE) similar to that of the material to which it is bonded or seals (e.g., the SOFC device frame materials, electrolyte materials and the like). Such SOFC device components may have a CTE on the order of about 100×10$^{-7}$/° C. to about 115×10$^{-7}$/° C. Accordingly, the CTE of the sealing material may be from about 95×10$^{-7}$/° C. to about 115×10$^{-7}$/° C. and, more specifically, from about 105×10$^{-7}$/° C. to about 115×10$^{-7}$/° C. such that the CTE of the sealing material is similar to the components to which it is bonded or sealed.

The sealing material may comprise glass frit from about 65 weight % to about 100 weight %, more preferably from about 70 wt % to about 100 wt % and most preferably from about 80 wt % to about 100 wt %. When the sealing material contains less than 100 wt % of glass frit, the sealing material may also comprise a mill addition or filler material (e.g., stabilized zirconia (ZrO$_2$), leucite (K$_2$O.Al$_2$O$_3$.4SiO$_2$) or magnesia (MgO)). The filler material may be added to raise or lower the CTE of the sealing material to a desired or acceptable range. However, in the embodiments described herein, the filler material is added to the sealing material to raise the CTE. This may be facilitated by using filler materials such as zirconia and leucite which have significantly higher CTEs (about 110× 10$^{-7}$/° C.-200×10$^{-7}$/° C.) than the glass frit composition. For example, as shown in Table 1, sample W may have a CTE on the order of about 102×10$^{-7}$/° C. following sintering without the addition of any filler material. However, by adding MgO filler to the composition prior to sintering such that the sealing material is 70 wt % glass frit and 30 wt % filler material, the CTE of the sintered glass frit+filler may be on the order of about 110×10$^{-7}$/° C. In general, to achieve a sealing material having the desired CTE, the sealing material may comprise less than about 35 wt. % of filler material, more preferably less than about 25 wt. % of filler material and, most preferably, less than about 20 wt. % of filler material such that the total wt. % of glass frit and the filler material is 100 wt. %. In one embodiment, the mean particle size of the filler material be less than about 20 μm and, more specifically, less than about 5 μm.

In one exemplary embodiment, the glass frit portion of the sealing material may generally be composed of at least three metal oxides. The composition may generally be expressed as:

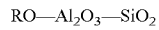

wherein RO represents a metal oxide where the metal R comprises magnesium, calcium, strontium, barium, zinc and/or combinations thereof. The metal oxide RO may typically be present in the composition in an amount from about 0 mol % to about 50 mol % and, more specifically, from about 0 mol % to about 44 mol %. Aluminum oxide (Al$_2$O$_3$) may be present in the composition from about 0 mol % to about 5 mol % while silicon oxide (SiO$_2$) may be present in the composition in an amount from about 40 mol % to about 60 mol % and, more specifically, from about 40 mol % to about 56 mol %. The addition of various metal oxides RO may serve to improve the viscosity of the glass frit composition at specific temperatures. For example, additions of magnesium oxide or zinc oxide may be added to lower the viscosity of the glass frit at the sealing temperature of the sealing material. The range of molar percentages for each metal oxide RO (e.g., magnesium oxide (MgO), calcium oxide (CaO), strontium oxide (SrO), barium oxide (BaO), zinc oxide (ZnO)), as well as the molar percentage ranges for aluminum oxide and silicon oxide are listed in Table 1 for the various exemplary compositions of sealing materials described herein.

In another embodiment, the glass frit portion of the sealing material may contain an additional metal oxide, such as titanium oxide. Additions of titanium oxide (TiO$_2$) may further modify the properties of the sealing material. For example, in one embodiment, titanium oxide may be added to the glass frit composition in conjunction with other metal oxides to modify the viscosity of the sealing material at temperatures around the sealing temperature of the material. In another embodiment, titanium oxide may be added to the glass frit composition to act as a nucleation catalyst for crystallization thereby lowering the crystallization temperature of the sealing material to a desired or acceptable range. When titanium oxide is added to the glass frit material, the composition of the glass frit may generally be expressed as:

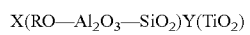

where X is typically from about 0.93 to about 1, more specifically from about 0.96 to 1 and Y is typically from about 0 to about 0.07, more preferably from about 0 to about 0.04, for example, 0.0005 to 0.039. A range of molar percentages for titanium oxide is shown in Table 1 for the various exemplary compositions of sealing materials described herein.

TABLE 1

| Component | Composition Range (mole %) |
|---|---|
| MgO | 0-10 |
| CaO | 5-44 |
| SrO | 5-28 |
| BaO | 0-17 |
| ZnO | 0-10 |
| $Al_2O_3$ | 0-5 |
| $TiO_2$ | 0-7 |
| $SiO_2$ | 40-60 |

Table 2 contains the molar compositions for a number of exemplary embodiments of glass frit compositions for the glass frit-based sealing materials described herein. The glass frit compositions may generally be described as silicate glasses modified with additives of several different metal oxides to enhance the properties of the sealing material and resulting seal. It should be noted that, to provide an electrochemically stable and contaminant free sealing material, the glass frit compositions and corresponding sealing materials described herein are free from materials such as lithium oxide ($Li_2O$), boron oxide ($B_2O_3$) and similar materials that may result in premature failure of the sealing material and/or the solid oxide fuel cell. More particularly, the glass frit compositions are free from oxides that demonstrate high ion mobility under an applied electric field. Accordingly, the glass frit compositions described herein are free from such oxides including, but not limited to all alkali oxides including, but not limited to $Li_2O$, $Na_2O$, $K_2O$, $Rb_2O$, $Cs_2O$. These oxides may result in the formation of oxygen blisters which may lead to the failure of the seal. Further, the glass frit compositions are also free from oxides and halides that may break down or lead to corrosion in the environment of the SOFC device thereby contaminating or fouling the cathode, anode or other components in the SOFC device. Accordingly, the glass frit compositions are free from such oxides and halides including, but not limited to, $B_2O_3$, $GeO_2$, $P_2O_5$ and all halides.

TABLE 2

| Composition ID | Composition (mol %) | | | | | | | |
|---|---|---|---|---|---|---|---|---|
| | MgO | CaO | SrO | BaO | ZnO | $Al_2O_3$ | $TiO_2$ | $SiO_2$ |
| A | 2 | 14.2 | 23.8 | — | — | — | 4 | 56 |
| B | — | 14.2 | 23.8 | — | 2 | 4 | — | 56 |
| C | — | 15 | 25 | — | — | — | 6 | 54 |
| D | 2 | 15 | 25 | — | — | — | 4 | 54 |
| E | 4 | 14.2 | 23.8 | — | — | — | 2 | 56 |
| F | — | 12.5 | 20.5 | 5 | 2 | — | 4 | 56 |
| G | 4 | 12 | 21 | 5 | — | — | 2 | 56 |
| H | — | 10 | 15 | 10 | 5 | — | 4 | 56 |
| I | — | 15 | 10 | 10 | 5 | — | 4 | 56 |
| J | 5 | 15 | 10 | 10 | — | — | 4 | 56 |
| K | 5 | 10 | 15 | 10 | — | — | 4 | 56 |
| L | — | 5 | 15 | 10 | 10 | — | 4 | 56 |
| M | — | 15 | 5 | 10 | 10 | — | 4 | 56 |
| N | 10 | 5 | 15 | 10 | — | — | 4 | 56 |
| O | 10 | 15 | 5 | 10 | — | — | 4 | 56 |
| P | — | 34.1 | 9.5 | — | 4.0 | 4.7 | — | 47.6 |
| Q | — | 38.1 | 8.5 | — | 5.0 | 4.7 | — | 42.6 |
| R | — | 40.6 | 9.5 | — | 2.5 | 4.7 | — | 42.6 |
| S | — | 42.1 | 9.5 | — | 3.0 | 4.7 | — | 40.6 |
| T | — | 42.1 | 9.5 | — | 4.0 | 1.7 | — | 42.6 |
| U | — | 43.1 | 9.5 | — | 5.0 | 1.7 | — | 40.6 |
| V | — | 33.2 | 11.5 | — | 2 | 2.7 | 3 | 47.6 |
| W | — | 15 | 25 | — | — | — | 4 | 56 |
| AA | — | 15 | 15 | 10 | — | — | 4 | 56 |
| BB | — | 15 | 15 | 10 | 0 | 0 | 4 | 56 |

EXAMPLES

The glass frit-based sealing materials will now be described in more detail with specific reference to exemplary compositions of the glass frit portion of the sealing materials contained in Tables 3-5. Specifically, Tables 3-5 show the glass frit composition in mole percent as well as the properties of the glass frit during and after sealing (or sintering) and aging at the indicated temperatures. More specifically, Tables 3-5 list a qualitative assessment of the viscous flow of the glass frit composition at the indicated sealing temperature of 850° C. where VG is indicative of very good, low viscosity flow, S is indicative of some flow (higher viscosity than VG, lower viscosity than P) and P is indicative of poor or low flow (higher viscosity than S). The tables also list the CTE of the glass frit for a specified range from room temperature (RT) to a specific upper limit following sintering of the glass frit material at the indicated temperature. It should be noted that the CTEs listed in Tables 3-5 are for the glass frit composition only, without the addition of any filler materials that may raise the CTE of the sealing material. In addition, Tables 3-5 also list the phase or phases (crystalline, glassy (amorphous) or combinations thereof) present in the glass frit following sintering and aging at the specified temperature for one hour. Finally, Tables 3-5 list the type of seal (soft or hard) which the sealing material may form after sintering and aging at the specified temperature. More specifically, if the sealing material completely crystallizes during cooling after aging, the resultant seal between the structures may be referred to as a hard seal. Hard seals do not exhibit viscous flow when exposed to the operating temperatures and thermal cycles of the SOFC device. However, if the sealing materials do not completely crystallize after cooling (e.g., the sealing materials comprise, at least in part, an amorphous or glassy phase without a crystal structure) the resultant seal between the structures may be referred to as a soft seal. Soft seals may exhibit some viscous flow when exposed to the operating temperatures and thermal cycles of the SOFC device due to the presence of the amorphous or glassy phase.

Table 3 shows four exemplary glass frit compositions having superior flow characteristics for use as soft seal sealing materials. The inventors have found that additions to the glass frit of zinc oxide (ZnO), titanium oxide ($TiO_2$), magnesium oxide (MgO), and/or combinations thereof, from about 2 mol % to about 14 mol %, specifically from about 6 mol % to about 14 mol % and more specifically from about 9 mol % to about 14 mol % may modify the viscosity of the sealing material and thereby provide a sealing material which exhibits superior (low) viscosity at the sintering temperature of the material (850° C. to about 900° C.). In general, such glass frit compositions may comprise from about 5 mol % to about 15 mol % CaO; from about 5 mol % to about 15 mol % SrO; about 10 mol % BaO; from about 5 mol % to about 10 mol % ZnO; about 4 mol % $TiO_2$; and about 56 mol % $SiO_2$. Glass frit in this composition range generally consists of only a glassy phase after sintering and aging at 850° C. while glass frit sintered and aged at 900° C. comprises both a glassy phase and a crystalline phase. Accordingly, based on the flow and phase characteristics, glass frit in this composition range is well suited for use as a soft seal sealing material.

It is important to note that the glass frit compositions shown in Table 3 generally have CTEs of less than about $95 \times 10^{-7}$/° C. Accordingly, such glass frit compositions may be blended with a filler material, as discussed above, to arrive at a sealing material composition having the desired CTE.

TABLE 3

| Composition ID | Composition (Mol %) | Flow @ 850° C. | CTE RT-500° C. (after 900° C. Sinter, No Filler) | Phase 850° C./1 hr | Phase 900° C./1 hr | Seal Type |
| --- | --- | --- | --- | --- | --- | --- |
| H | CaO 10<br>SrO 15<br>BaO 10<br>ZnO 5<br>TiO$_2$ 4<br>SiO$_2$ 56 | VG | 93 × 10$^{-7}$/° C. | glass | glass & crystal | soft |
| I | CaO 15<br>SrO 10<br>BaO 10<br>ZnO 5<br>TiO$_2$ 4<br>SiO$_2$ 56 | VG | 94.8 × 10$^{-7}$/° C. | glass | glass & crystal | soft |
| L | CaO 5<br>SrO 15<br>BaO 10<br>ZnO 10<br>TiO$_2$ 4<br>SiO$_2$ 56 | VG | 94.7 × 10$^{-7}$/° C. | glass | glass & crystal | soft |
| M | CaO 15<br>SrO 5<br>BaO 10<br>ZnO 10<br>TiO$_2$ 4<br>SiO$_2$ 56 | VG | 90.2 × 10$^{-7}$/° C. | glass | glass & crystal | soft |

Table 4 shows three exemplary compositions of glass frit having relatively high CTEs for use as soft seal sealing materials. The inventors have found that, by limiting the ZnO to less than about 5 mol % and, more specifically, from about 2 mol % to about 4 mol % ZnO, a sealing material may be produced having a CTE of about 104×10$^{-7}$/° C. or greater, particularly when the ZnO is added in partial replacement of SiO$_2$. Accordingly, the glass frit materials may have a molar composition of from about 33.2 mol % to about 42.1 mol % CaO; from about 9.5 mol % to about 11.5 mol % SrO; from about 2 mol % to about 3 mol % ZnO; from about 2.7 mol % to about 4.7 mol % Al$_2$O$_3$; and from about 40.6 mol % to about 47.6 mol % SiO$_2$. Because glass frit compositions in this compositional range have CTEs more closely compatible with the CTEs of other components in the SOFC device, no addition of filler material is required to further enhance or raise the CTE of the composition. Moreover, the inventors have also found that the presence of ZnO in the glass frit composition contributes to acceptable flow characteristics of the glass frit at a sealing temperature of about 850° C. As shown in Table 4, glass frit having the above referenced composition generally comprises a glassy phase after sintering and aging at both 850° C. and 900° C. Accordingly, such glass frit compositions are suited for use as soft seals in SOFC devices.

TABLE 4

| Composition ID | Composition (Mol %) | Flow @ 850° C. | CTE RT-700° C. (after 850° C. Sinter, No Filler) | Phase 850° C./1 hr | Phase 900° C./1 hr | Seal Type |
| --- | --- | --- | --- | --- | --- | --- |
| R | CaO 40.6<br>SrO 9.5<br>ZnO 2.5<br>Al$_2$O$_3$ 4.7<br>SiO$_2$ 42.6 | S | 104.1 × 10$^{-7}$/° C. | glass & crystal | glass & crystal | soft |
| S | CaO 42.1<br>SrO 9.5<br>ZnO 3.0<br>Al$_2$O$_3$ 4.7<br>SiO$_2$ 40.6 | S | 109.0 × 10$^{-7}$/° C. | glass & crystal | glass & crystal | soft |
| V | CaO 33.2<br>SrO 11.5<br>ZnO 2<br>Al$_2$O$_3$ 2.7<br>TiO$_2$ 3<br>SiO$_2$ 47.6 | S | 107.1 × 10$^{-7}$/° C. | glass & crystal | glass & crystal | soft |

Table 5 shows three exemplary compositions of glass frit for use in sealing materials which may be employed as either soft seals or hard seals depending on the sealing temperature and aging temperature employed (850° C. or 900° C.). Specifically, the inventors have unexpectedly discovered that glass frit having a composition of about 15 mol. % calcium oxide (CaO), from about 15 mol % to about 25 mol % strontium oxide, from about 0 mol. % to about 10 mol % barium oxide (e.g. 0.01 mole % to 9.8 mole %) from about 4 mol % to about 6 mol % titanium oxide and from about 54 mol % to about 56 mol % silicon oxide, such as the exemplary compositions shown in Table 5, become highly crystallized at sintering and aging temperatures of about 900° C. Such materials do not exhibit any viscous flow or visco-elastic relaxation during thermal cycling. Accordingly, sealing materials utilizing these compositions of glass frit are well suited for use as hard seals in SOFC devices. However, glass frit materials in the same compositional range exhibit different properties when exposed to sintering temperatures of about 850° C. or less. Specifically, when the glass frit is sintered at about 850° C. the glass frit comprises, at least in part, a glassy or amorphous phase such that the glass frit is suitable for use as a soft seal material. The crystallization characteristics of these compositions are primarily a result of the addition of $TiO_2$ which acts as a nucleation catalyst and facilitates and promotes crystallization of the glass frit at temperatures of around 900° C.

Of the three glass frit compositions listed in Table 5, glass frit composition BB has the highest CTE ($111.1 \times 10^{-7}/°$ C.) which is directly related to the formation of the barium-containing compound fresnoite ($Ba_2TiSiO_8$) in the crystalline phase after aging at 900° C. Glass frit composition BB also has superior viscous flow relative to compositions W and AA. Further, because composition BB consists of only a glassy phase after aging at 850° C., BB possesses a greater temperature range over which the composition demonstrates viscous flow before crystallizing. This extended period of viscous flow prior to crystallization leads to better sintering and densification, lower porosity, and improved adhesion to fuel cell components thus providing for an improved hard seal relative to compositions W and AA.

coatings to prevent the diffusion of chromium from the high chromium content stainless steel frame material of the SOFC device to interior portions of the SOFC device thereby reducing or mitigating contamination of the SOFC device. Chromium diffuses from the frame into the SOFC when the frame material oxidizes and forms an oxide layer on the surface of the frame between the frame and the sealing material. When the sealing material contains barium, chromium from the frame diffuses into the sealing material and reacts with the barium forming barium-chromite crystals in the sealing material. The presence of barium-chromate in the sealing material ultimately leads to the breakdown and/or failure of the sealing material. Accordingly, sealing materials devoid of barium do not react with the chromium and, therefore, do not promote the diffusion of chromium into the SOFC device. Therefore, barium-free sealing material may be applied directly to the surface of the frame or other materials in the SOFC device containing chromium thereby forming a barrier against Cr diffusion. The barium-free sealing material may then be used in conjunction with another sealing material (including a sealing material containing barium) or alone to seal or join two components of the SOFC device.

The inventors have also found that certain other exemplary compositions of sealing materials containing barium may also be used as barrier coatings against chromium diffusion. In particular, the inventors have found that sealing materials containing barium may be used as a barrier coating against chromium diffusion when the barium contained in the sealing material is in a crystalline phase. For example, sealing material composition BB contains barium. However, when the material forms a hard seal, the barium in the sealing material is in the form of crystalline fresnoite ($Ba_2TiSi_2O_8$). As such, the barium is not free to react with other materials in the SOFC which, in turn, prevents the diffusion of chromium from the frame of the SOFC device to the interior. Accordingly, sealing materials comprising barium in a crystalline phase may be applied to chromium-containing components in the SOFC device thereby preventing diffusion of the chromium into the interior of the SOFC device and mitigating contamination of the SOFC by chromium.

TABLE 5

| Composition ID | Composition (Mol %) | Flow @ 850° C. | CTE RT-700° C. (No Filler) | | Phase | | Seal Type | |
|---|---|---|---|---|---|---|---|---|
| | | | 850° C. Sinter | 950° C. Sinter | 850° C. 1/hr | 900° C. 1/hr | 850° C. | 900° C. |
| W | CaO 15<br>SrO 25<br>$TiO_2$ 4<br>$SiO_2$ 56 | P | $102.3 \times 10^{-7}/°$ C. | $104.2 \times 10^{-7}/°$ C. | glass & crystal | highly crystal | soft | hard |
| AA | CaO 15<br>SrO 25<br>$TiO_2$ 6<br>$SiO_2$ 54 | P | $102.1 \times 10^{-7}/°$ C. | — | glass & crystal | highly crystal | soft | hard |
| BB | CaO 15<br>SrO 15<br>BaO 10<br>$TiO_2$ 4<br>$SiO_2$ 56 | S | $98.1 \times 10^{-7}/°$ C. | $111.1 \times 10^{-7}/°$ C. | glass & crystal | highly crystal | soft | hard |

Further, certain exemplary compositions of sealing materials described herein may be free from barium-containing compounds such as compositions W, AA, S, R, and V. In addition to being used as a sealing material, the inventors have also found that such compositions may also be used as barrier As discussed hereinabove, the sealing materials described herein may be used in conjunction with solid oxide fuel cell devices to provide a seal between the frame of the solid oxide fuel cell device and internal components of the solid oxide fuel cell device. The sealing materials may also be used as a seal between individual cells within the solid oxide fuel cell device. Referring now to FIG. 1, an exemplary embodiment of a solid oxide fuel cell (SOFC) device is depicted. The SOFC device generally comprises a stack of individual fuel cells with each individual fuel cell comprising layers of a solid electrolyte, a cathode plate, and an anode plate. Each individual fuel cell may be isolated from an adjacent cell and/or the frame of the SOFC device by a glass-frit-based sealing material which encapsulates each individual fuel cell. The glass-frit-based seals may also comprise a plate-like structure disposed between adjacent cells. The general structure of the SOFC device will now be described in more detail.

Figure 2:
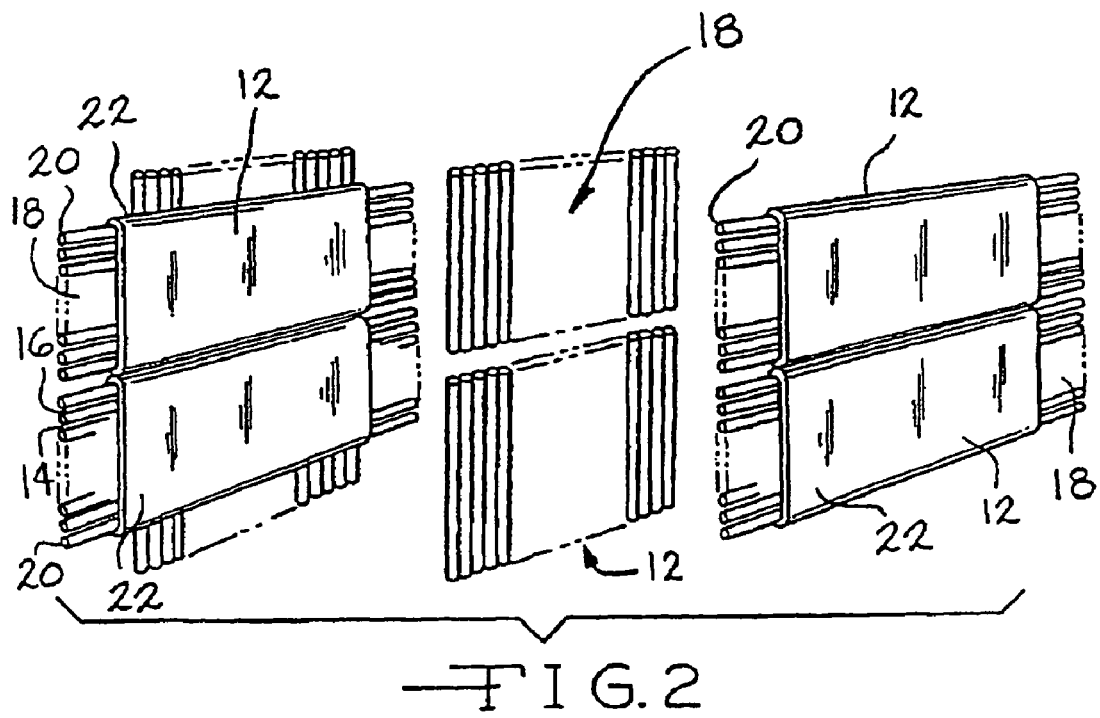
FIG. 2 is an exploded perspective view of a portion of the solid oxide fuel cell device assembly of FIG. 1.

FIG. 1 shows a perspective view of a typical SOFC device assembly 10. The assembly is generally contained within a frame (not shown) comprising a corrosion resistant material such as high chromium stainless steel or a similar material. FIG. 2 depicts a portion of the SOFC device assembly 10, including stacks of individual fuel cell devices 12. The SOFC device assembly 10 includes individual fuel cell devices 12 in an alternating orientation, with each individual fuel cell device 12 composed of layers of a solid electrolyte (not shown) and alternating anode 14 and cathode 14 plates. The solid electrolyte generally is yttrium-doped zirconia ($ZrO_2$). Each fuel cell device 12 also comprises a distribution member 18 which embodies a plurality of parallel passages 20 for the supply of electrolyte, oxidant and/or fuel. The axes of the passages 20 lie in a common plane.

The distribution member 18 is preferably constructed from two corrugated ceramic plates. The corrugations of the plates have a parallel arrangement and the troughs of one of the plates are bonded to the peaks of the other plate. This results in the formation of passages 20 which have a diameter on the order of 2 mm.

As shown in FIG. 2, a support structure 22 surrounds distribution member 18 and extends across the distribution member 18 in the transverse direction. In one embodiment, the support structure 22 may comprise a porous material. The support structure 22 contacts the peaks and troughs of member 18 to form a plurality of parallel passages which are either anode 14 or cathode 16 chambers of the individual solid oxide fuel cell devices 12. The anode 14 and cathode 16 chambers provide for the distribution and removal of the electrolyte in the individual solid oxide fuel cell devices 12. The corrugated ceramic plates have apertures between the passages 20 to allow fuel to flow from the passages 20 into the anode 14 or cathode 16 chambers of the solid oxide fuel cell device 10.

Figure 3:
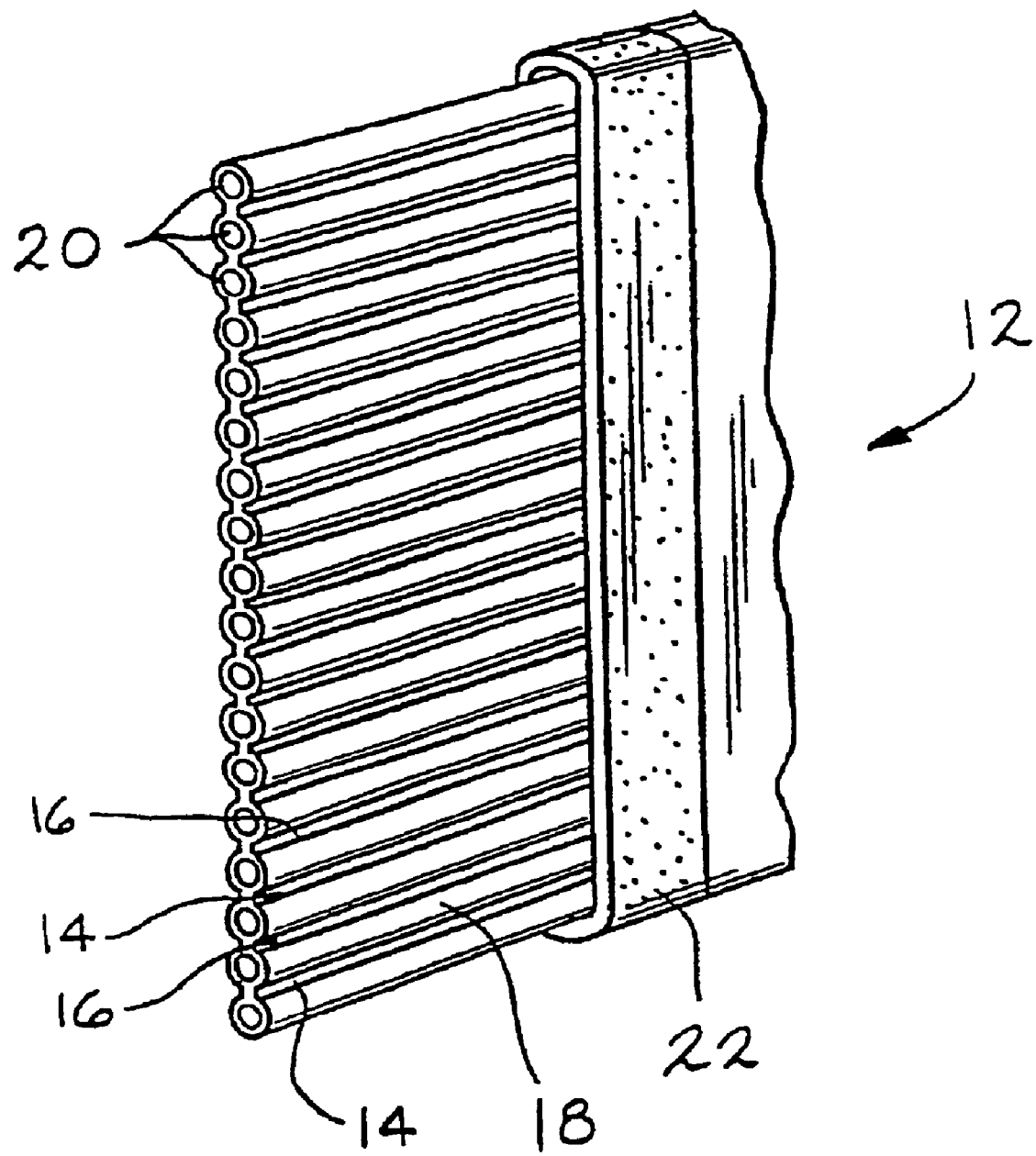
FIG. 3 is a perspective view of an exemplary fuel cell device.

FIG. 3 is an exploded fragmentary view showing alternating anodes 14 and cathodes 16 and their relationship to passages 20.

In one embodiment, the glass frit-based sealing materials described herein may encapsulate each individual fuel cell device 12. In another embodiment, the glass-frit-based seals may form a barrier between each individual fuel cell device 12. When forming a barrier, the glass-frit-based sealing materials may take the form of a plate of sealing material (not shown) disposed between adjacent individual fuel cell devices 12. The glass-frit-based sealing materials are suitable for preventing the diffusion of hydrogen gas from each individual fuel cell device 12 to another thereby sealing each individual fuel cell device 12 from an adjacent individual fuel cell device 12. In another embodiment, the glass-frit-based sealing materials of the present invention may be used to form a seal between the individual fuel cell devices and the frame (not shown) of the SOFC device. In yet another embodiment, the support structure 22 may also comprise the glass-based sealing materials described herein.

While FIGS. 1-3 depict a specific SOFC device structure, it should be understood that the glass frit-based sealing materials may be used in SOFC devices having structures different than that depicted in FIGS. 1-3. Further, such glass frit-based sealing materials may be used in any application where one or more of the SOFC device components must be sealed from another component. Accordingly, no particular limitation is intended as to the use of the glass frit-based sealing materials in conjunction with a particular SOFC device and such glass frit-based sealing materials may be generally used in conjunction with any SOFC device.

In one embodiment, to effect a seal between two adjacent structures, such as between two adjacent sheets of ceramic electrolyte of individual fuel cell devices or the ceramic electrolyte of an individual fuel cell device and the metal frame of the SOFC device, a paste comprising a powdered sealing material having a composition described herein in a solvent base or other, similar carrier vehicle is applied to the structures to be sealed. The paste may be applied to the surface of the structures using a dispenser. Once applied to each structure (but prior the components being joined or assembled together), each structure and the applied sealing material paste may be heated to about 125° C. to remove binder material from the paste and thereby stiffen the paste. Thereafter, the structures are joined together in a single assembly with the sealing material paste dispensed there between. The entire assembly is then heated to the sintering temperature of the sealing material to cause the sealing material to flow between the structures thereby wetting the structures at the interface. The assembly is then cooled causing the sealing material to solidify and bond to each of the structures thereby joining the structures together with a hard or soft seal.

In another embodiment, to effect a seal between two adjacent structures, sealing material such as a powdered sealing material having a composition described herein is placed along the interface between the two structures. The entire assembly is then heated to the sintering temperature of the sealing material thereby causing the sealing material to flow between the structures thereby wetting the structures at the interface. The assembly is then cooled causing the sealing material to solidify and bond to each of the structures thereby joining the structures together. As discussed hereinabove, the resultant sealing material may either be a hard seal or a soft seal depending on the absence of presence of a glassy phase in the cooled sealing material.

It should now be understood that the various glass frit-based sealing material compositions described herein may be used to form electro-chemically stable, contaminant-free seals for use in conjunction with such applications as solid oxide fuel cell devices. More particularly, certain compositions of glass frit-based sealing materials exhibit improved flow or viscosity characteristics in the sealing temperature range of about 850° C. to about 900° C. while displaying CTEs compatible with other components in the SOFC device with the addition of filler materials to the composition. Such compositions may comprise a glassy phase following sintering and aging at the sealing temperatures and, as such, may be suitable for use as a soft seal in solid oxide fuel cell devices due to the presence of the glassy phase. Other compositions of glass frit-based sealing materials described herein exhibit CTEs greater than about $104 \times 10^{-7}$/° C. without additions of any filler material. Such sealing materials offer a significant benefit as the sealing materials have CTEs which are directly compatible with other materials in the SOFC fuel cell without further modification such as the addition of filler materials.

These compositions may comprise a glassy phase following sintering and aging at the sealing temperatures and, as such, may be suitable for use as a soft seal in solid oxide fuel cell devices due to the presence of the glassy phase.

Further, certain compositions of sealing materials described herein may be free from barium-containing compounds. In addition to being used as a sealing material, such compositions may also be used as a barrier coatings to prevent the diffusion of chromium from the frame material of the SOFC device to interior portions of the SOFC device thereby reducing or mitigating contamination of the SOFC device. Similarly, other compositions of sealing material may comprise barium-containing compounds such that, after sintering and aging, the barium is only present in the sealing material in a crystalline phase thereby reducing the possibility that the barium will react with other materials in the SOFC device and lead to chromium diffusion and contamination.

Moreover, the inventors have unexpectedly found that certain compositions of glass frit-based sealing materials containing titanium oxide are highly crystalline following sintering and aging at about 900° C. while comprising a glassy phase after sintering or aging at less than about 900° C. Such materials may be suitable for forming both hard seals and soft seals depending on the sealing temperatures applied to effect sealing.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A sealing material for use in conjunction with a solid oxide fuel cell device, the sealing material comprising a coefficient of thermal expansion of about $95 \times 10^{-7}/°$ C. to about $115 \times 10^{-7}/°$ C. and:

(i) from about 80 wt % to about 100 wt % of glass frit, the glass fit being alkali metal and boron free and comprising:
   from about 0 mol % to about 10 mol % MgO;
   from about 5 mol % to about 15 mol % CaO;
   from about 5 mol % to about 15 mol % SrO;
   about 0.1 mol % to 10 mol % BaO;
from about 0 mol % to about 10 mol % ZnO;
   about 0.1 mol % to 4 mol % $TiO_2$;
   about 50 mol % to 60 mol % $SiO_2$; and
(ii) from about 0 wt % to about 20 wt % of a filler material wherein the filler material increases the coefficient of thermal expansion of the sealing material.

2. The sealing material of claim 1 wherein the glass fit comprises:
   from about 5 mol % to about 15 mol % CaO;
   from about 5 mol % to about 15 mol % SrO;
   about 10 mol % BaO;
   from about 5 mol % to about 10 mol % ZnO;
   about 4 mol % $TiO_2$; and
   about 56 mol % $SiO_2$.

3. The glass sealing material of claim 1 wherein the glass frit comprises a glassy phase after sintering at temperatures from about 850° C. to about 900° C. for 1 hour.

4. The glass sealing material of claim 1 wherein the glass fit has a CTE of greater than about $104 \times 10^{-7}/°$ C. after sintering at a temperature of 900° C. for 1 hour.

5. The sealing material of claim 1 wherein the filler material comprises stabilized zirconia, leucite, magnesia or combinations thereof.

6. The sealing material of claim 1 wherein the glass frit consists of a crystalline phase after sintering and aging at a temperature of about 900° C. for one hour.

7. The sealing material of claim 1 wherein, after the sealing material is heated to a sealing temperature, at least some of the barium in the glass frit is in a crystalline phase.

* * * * *

UNITED STATES PATENT AND TRADEMARK OFFICE
CERTIFICATE OF CORRECTION

PATENT NO. : 7,989,374 B2
APPLICATION NO. : 12/152540
DATED : August 2, 2011
INVENTOR(S) : Melinda Ann Drake et al.

It is certified that error appears in the above-identified patent and that said Letters Patent is hereby corrected as shown below:

| No. | Col. | Line | Description |
|---|---|---|---|
| 1 | 14 | 2 | "glass fit being alkali metal and boron free and compris-" -- should be -- "glass frit being alkali metal and boron free and compris-" |
| 2 | 14 | 14 | "2. The sealing material of claim 1 wherein the glass fit" -- should be -- "2. The sealing material of claim 1 wherein the glass frit" |
| 3 | 14 | 25 | "4. The glass sealing material of claim 1 wherein the glass fit" -- should be -- "4. The glass sealing material of claim 1 wherein the glass frit" |

Signed and Sealed this
First Day of May, 2012

David J. Kappos
*Director of the United States Patent and Trademark Office*